United States Patent [19]

Mullis

[11] 4,058,186

[45] Nov. 15, 1977

[54] ELEVATOR SYSTEM WITH RETAINER DEVICE FOR PLURALITY OF TRAVELING CABLES

[75] Inventor: Clyde M. Mullis, Glen Rock, N.J.

[73] Assignee: Westinghouse Electric Corporation, Pittsburgh, Pa.

[21] Appl. No.: 691,176

[22] Filed: May 28, 1976

[51] Int. Cl.² .............................................. B66B 7/06
[52] U.S. Cl. ................................ 187/1 R; 24/16 PB; 174/70 R; 248/74 PB
[58] Field of Search ........................... 187/1 R, 20, 95; 174/70 R, 72 A; 248/74 PB, 74 B, 68 R; 24/16 PB, 129 D, 286

[56] References Cited

U.S. PATENT DOCUMENTS

| | | | |
|---|---|---|---|
| 1,145,914 | 7/1915 | Magnuson | 187/1 R |
| 1,822,153 | 9/1931 | Kinnard | 187/1 R |
| 1,864,093 | 6/1932 | Prince | 187/95 |
| 2,017,372 | 10/1935 | Morrison | 187/1 R |
| 2,342,958 | 2/1944 | Morehouse | 248/74 PB |
| 2,602,524 | 7/1952 | Shirley | 187/1 R |
| 3,344,888 | 10/1967 | Connelly et al. | 187/1 R |
| 3,430,733 | 3/1969 | Smith | 187/1 R |
| 3,601,863 | 8/1971 | Dorsey | 24/16 PB |
| 3,750,849 | 8/1973 | Berkovitz | 187/20 |
| 3,885,773 | 5/1975 | Dunkelberger | 187/95 |

FOREIGN PATENT DOCUMENTS

| | | | |
|---|---|---|---|
| 1,250,987 | 9/1967 | Germany | 187/1 R |
| 117,148 | 9/1975 | Japan | |
| 1,048,306 | 11/1966 | United Kingdom | 187/1 R |

Primary Examiner—Evon C. Blunk
Assistant Examiner—Jeffrey V. Nase
Attorney, Agent, or Firm—D. R. Lackey

[57] ABSTRACT

An elevator system including an elevator car mounted for vertical movement in the hoistway of a building, and a plurality of traveling cables which interconnect the elevator car and a junction box in the hoistway. The plurality of traveling cables are bundled to track as a single cable by a plurality of spaced retainer devices. Each retainer device includes a first portion which is tightly secured to one of the traveling cables, and a second portion which loosely encircles all of the traveling cables.

4 Claims, 3 Drawing Figures

ELEVATOR SYSTEM WITH RETAINER DEVICE FOR PLURALITY OF TRAVELING CABLES

BACKGROUND OF THE INVENTION

1. Field of the Invention

The invention relates in general to elevator systems, and more specifically, to elevator systems which have a plurality of traveling cables.

2. DESCRIPTION OF THE PRIOR ART

The operation of an elevator car requires a large number of control and signal wires between the elevator car and elevator control located in the machine room. Electrical power for car lighting fixtures and fans is supplied to the car, as well as electrical power for operating car mounted control. Control signals from car mounted switches and sensors must be sent to the machine room, as well as car calls entered on the call station. Control signals, such as car call resets and remotely set car calls must be sent to the elevator car. In addition to the functional control and signal wires, it is common to provide at least four spare control wires and four spare signal wires. If voice communication between the elevator car and a remote communication point is required, additional wires for such communication are provided.

The control and signal wires are assembled together into a traveling cable which extends from a junction box on the bottom of the elevator car to a junction box in the hoistway which is usually located at the midpoint of the elevator car travel path. The traveling cable is suspended from the bottom of the car such that it forms a loop below the car, with the bight of the loop moving with vertical movement of the car. When the traveling cable exceeds a length of about 100 feet, the weight of the cable is supported by a steel strand which is added to the traveling cable, with the ends of the steel strand being separately mounted on the car and in the hoistway.

The traveling cable is free to swing pendulum fashion due to car movement, bending of the traveling cable in the bight, and to air currents in the hoistway, and the prior art has used different arrangements for protecting the traveling cable from damage which may occur if the traveling cable contacts structural members in the hoistway. For example, U.S. Pat. No. 3,430,733 discloses a split, flexible protective tube which is snapped about the traveling cable at locations which might contact structural members in the hoistway. U.S. Pat. No 3,344,888 guides the traveling cable in a separate vertical chute having a slot therein.

The traveling cable must be flexible in order to bend properly in the bight which moves as the car moves. In high rise buildings, the total weight of the traveling cable increases, and the number of control and signal wires may also increase, necessitating a plurality of separate traveling cables in order to provide the desired cable flexibility. It has been found that the bights or bottom portions of the loops of the plurality of traveling cables do not stay in line as one might expect, but exhibit an erratic movement with respect to one another, often resulting in entanglement with other items in the hoistway, such as with the compensation cables, as well as causing undesirable contact with structural members and hoistway mounted equipment. A special traveling cable chute is very costly for high rise buildings, and protective tubes would not prevent entanglement of the plurality of traveling cables with the compensation cables.

SUMMARY OF THE INVENTION

Briefly, the present invention is a new and improved elevator system which includes an elevator car mounted for vertical movement in the hoistway of a building, and a plurality of traveling cables which interconnect the elevator car with a junction box in the hoistway. A plurality of traveling cable retainer devices are assembled about the traveling cables at predetermined spaced locations. Each retainer device includes first and second integral portions, which may simply be portions of a single strap. The first portion is secured tightly to one of the traveling cables, such as by strapping it tightly about the traveling cable. In a preferred embodiment, an elastomeric member is first disposed about the selected traveling cable, and the first portion of the device is wrapped tightly about the elastomeric member. The second portion is looped about all of the traveling cables, in a non-stretched condition. It is critical that the second portion loosely encircle the traveling cables such that all are free to move in an axial direction relative to one another to compensate for different lengths and constructions, as the cables bend at the bight of their respective loops.

The spaced retainers harness the normally erratic movement of the cables relative to one another, providing offsetting horizontal or lateral forces which cause the plurality of cables to track better than a single traveling cable, with the reduced overall motion greatly reducing the possibility of entanglement. In addition to the reduction of motion by offsetting horizontal forces, the plurality of cables track as a single heavier cable without sacrificing flexibility, since each is free to individually flex in the bight and to freely move longitudinally in the direction of its central axis.

BRIEF DESCRIPTION OF THE DRAWINGS

The invention may be better understood, and further advantages and uses thereof more readily apparent, when considered in view of the following detailed description of exemplary embodiments, taken with the accompanying drawings in which.

DESCRIPTION OF PREFERRED EMBODIMENTS

Figure 1:
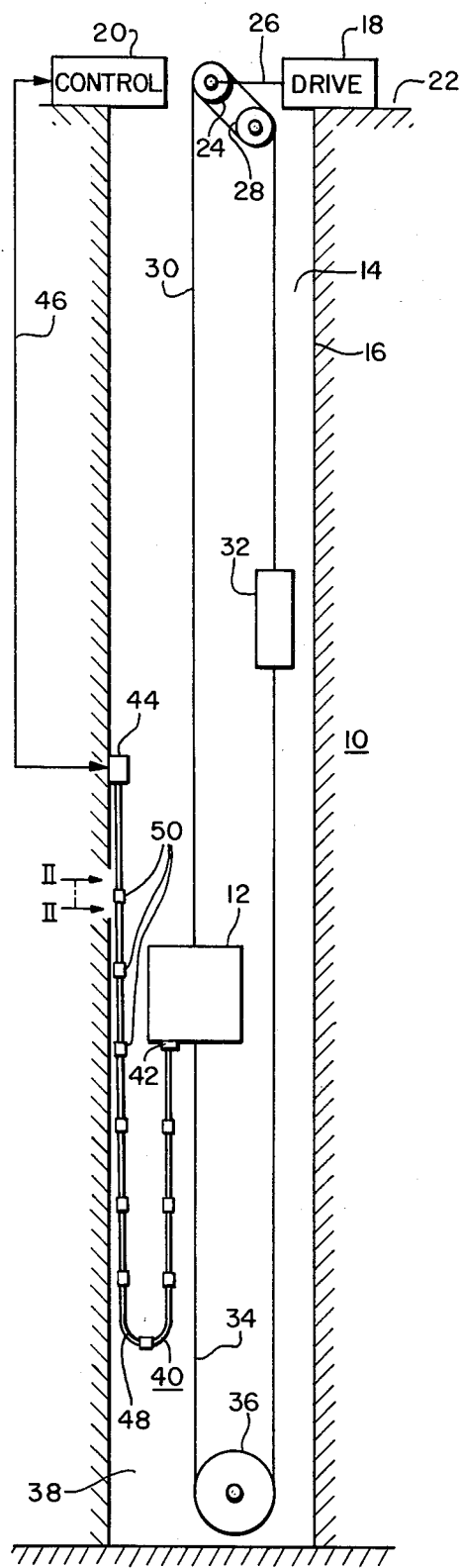
FIG. 1 is a diagrammatic view of an elevator system constructed according to the teachings of the invention.

Referring now to the drawing, and to FIG. 1 in particular, there is shown an elevator system 10 of the traction type constructed according to the teachings of the invention. Elevator system 10 includes an elevator car 12 mounted for guided vertical movement in a hoistway 14 of a structure or building 16 having a plurality of floors to be served by the elevator car. An elevator drive motor 18 and electrical control 20 for the elevator car 12 are mounted in the machine room, such as in the penthouse 22 of the building 16. The drive motor 18 is connected to a traction sheave 24 via a drive shaft shown generally at 26, and an idler or deflection sheave 28, as required, may be secured to the lower surface of the penthouse floor over the hoistway 14.

Hoist ropes or cables 30 interconnect the elevator car 12 with a counterweight 32, with the latter also being mounted for guided vertical movement in the hoistway 14. The hoist ropes 30 are fastened to the top of the elevator car 12, and they extend to the counterweight via the traction and idler sheaves 24 and 28, respectively, either using the double wrap illustrated, or a single wrap, as desired.

Compensator cables or ropes 34 interconnect the elevator car 12 with the counterweight 32. The compensator ropes 34 are fastened to the bottom of the elevator car, and they are directed to the bottom of the counterweight via a compensator sheave 36 disposed in the pit 38.

A plurality of separate traveling cables, shown generally at 40, interconnect a junction box 42 on the elevator car with a junction box 44 mounted in the hoistway. The junction box 44 is generally mounted near the midpoint of the vertical travel path of the elevator car. The junction box 44 is connected to the control 20 in the machine room by a plurality of wires shown generally at 46, to complete the continuity of the control and signal wires required between the elevator control 20 and the elevator car 12.

The traveling cable assembly 40 is suspended below the elevator car in a free hanging loop having a bight portion 48 which moves up and down with up and down travel of the elevator car 12.

The plurality of traveling cables 40 include a plurality of spaced traveling cable guide means or devices 50 which cause the plurality of traveling cables to track better than a single cable, reducing sway and minimizing the possibility of entanglement of the traveling cables with the compensator cables 34, as well as reducing the chance of contact between the traveling cables with other items in the hoistway 14.

Figure 3:
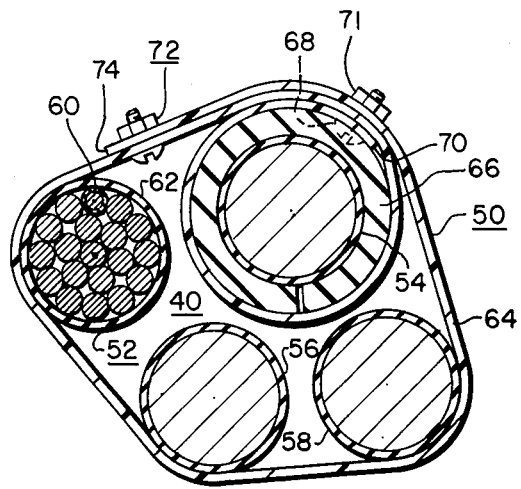
FIG. 3 is a cross-sectional view of the traveling cable assembly shown in FIG. 2, taken between arrows III—III.
Figure 2:
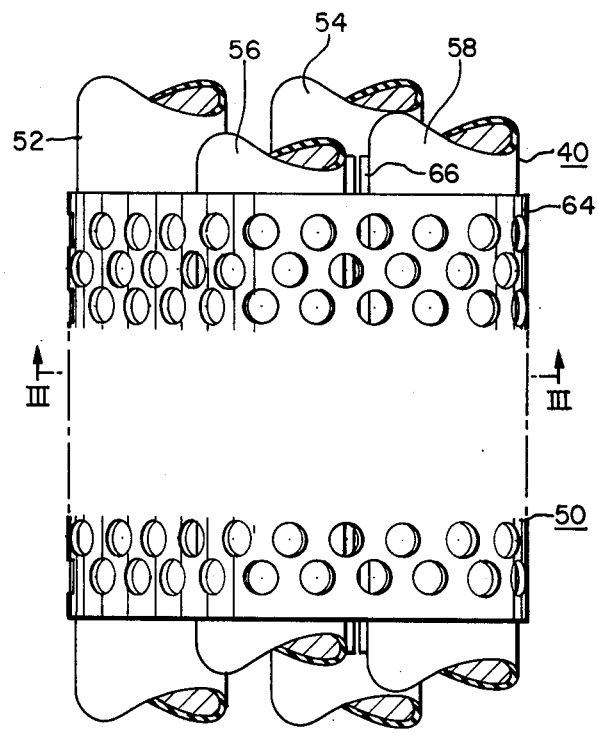
FIG. 2 is a fragmentary view of the traveling cable assembly shown in FIG. 1 taken between arrows II—II.

FIG. 2 is an enlarged, fragmentary view, in elevation, of a traveling cable guide device 50 taken in the direction of arrows II—II in FIG. 1. FIG. 3 will also be referred to when describing the guide device 50, which is a view of the device 50 and traveling cables 40 in cross-section, taken between and in the direction of arrows III—III in FIG. 2.

For purposes of example, it will be assumed that the traveling cables 40 include four separate traveling cables 52, 54, 56 and 58, but any number starting with two may be used, as required by a specific elevator installation. Each traveling cable, such as traveling cable 52, includes a plurality of insulated control and signal wires 60 which are bundled together to form a single traveling cable structure by an outer cover portion 62.

The traveling cable retainer means 50 is tightly secured to one of the plurality of traveling cables, and it loosely encircles all of the traveling cables. It is critical to the invention that the retainer means does not tightly encircle the plurality of traveling cables as each cable must be allowed to freely bend in the bight portion of its loop and to adjust its length as required as the cable moves through its bight portion, without any restraint from the other cables. The plurality of traveling cables are not precisely the same length, and they may have different constructions due to different numbers and gauges of wires therein. Thus, they will move relative to one another in the direction of their longitudinal axes, and any restriction on this movement will destroy the flexibility of the assembly, which flexibility was the reason for using a plurality of traveling cables instead of one large traveling cable.

FIGS. 2 and 3 illustrate an embodiment of the invention which utilizes a flexible strap 64 formed of a strong, but light electrical insulating material, such as a synthetic plastic material. A strap formed of perforated Nylon has been found to be suitable, but straps of other constructions and materials may be used.

One end of the strap 64 is wrapped tightly about one of the traveling cables, such as traveling cable 54, and as illustrated in FIGS. 2 and 3, an elastomeric member 66 is preferably placed snugly about the traveling cable where the strap 64 is to encircle the traveling cable. This arrangement permits the strap to be securely tightened about the traveling cable by compressing the elastomeric member 66. The elastomeric member 66 may be formed of soft rubber, or equivalent.

Strap 64 may be wrapped about the traveling cable 54 with at least about 1¼ wrap, as illustrated, with a suitable fastening means being used to maintain the tight wrap. One or more bolts 68 may be inserted through perforations in the strap adjacent the starting end 70 of the strap 64, with the head portions of the bolts contacting the elastomeric member 66. The strap 64 is then wrapped tightly about the elastomeric member 66, compressing it until the bolts 68 line up with perforations in the strap portion which overlaps end 70. The bolts 68 may be cocked or angled slightly to allow the strap 64 to move downwardly against its starting end such that the bolt 68 will enter perforations therein and maintain the tight wrapping of the first portion of the strap 64 about traveling cable 54. The strap 64, starting at the bolt 68, is then loosely wrapped about all of the traveling cables 52, 56, 58 and 54, taking care to insure that the wrapping is loose enough to allow relative longitudinal movement of all of the traveling cables. As the strap 64 completes a turn about the four traveling cables, the bolts 68 are inserted through perforations in the strap and nuts 71 are tightened on the bolt 68 to maintain not only the tight loop of the first portion of the strap 64 about traveling cable 54, but also the loose wrap or loop of a second portion of the strap 64 about all of the traveling cables. Additional fastening means, such as the nut and bolt combination 72, may be disposed through aligned perforations near the second end 74 of the strap 64, to secure the outer end of the strap tightly to the turn of the strap which encircles the four traveling cables.

In summary, there has been disclosed a new and improved elevator system which includes an elevator car and a plurality of traveling cables. The plurality of traveling cables are guided by suitably spaced retainer means, such as a spacing of about 50 feet, with the retainer means being constructed and arranged to enable each of the individual traveling cables to retain its individuality and thus flexibility, while causing the assembly traveling cables to track better than a single traveling cable. The erratic relative movement of a plurality of traveling cables is utilized by the invention to provide offsetting lateral forces which result in the improved tracking of the plurality of traveling cables compared with a single cable.

I claim as my invention:
1. An elevator system, comprising:
   a building having a hoistway,
   an elevator car mounted for vertical movement in the hoistway of said building, a plurality of flexible electrical traveling cables connected between said elevator car and a predetermined point of the hoistway, said plurality of cables being suspended from said elevator car such that each hangs in the hoistway with a bight which moves with car movement, and traveling cable retainer means including a plurality of retainer devices, each of said retainer devices including a flexible strap having a first portion tightly secured to one of said traveling cables, and a second portion disposed about all of the traveling cables in a non-stretched condition to provide a loose containment thereof, said plurality of retainer devices being disposed about said traveling cables at spaced locations such that the traveling cables track as a single cable without restricting relative longitudinal movement between the traveling cables.

2. The elevator system of claim 1 including a plurality of elastomeric members, each of said elastomeric members being disposed about one of the traveling cables, with the first portion of each strap being tightly wrapped about an elastomeric member, and including fastening means disposed to maintain the tight wrap of each strap about its associated elastomeric member and the loose containment of the traveling cables by the second portion of each strap.

3. The elevator system of claim 1 including elastomeric means disposed between the first portion of the retainer device and the traveling cable it is secured to.

4. An elevator system, comprising:
a building having a hoistway,
an elevator car mounted for vertical movement in the hoistway of said building,
a plurality of flexible traveling cables connected between said elevator car and a predetermined point of the hoistway,
said plurality of traveling cables being suspended from said elevator car such that each hangs in the hoistway with a bight which moves with car movement,
and a plurality of retainer devices disposed about said traveling cables at predetermined spaced locations,
each of said retainer devices including an elastomeric member, a strap member, and fastening means, said elastomeric member encircling one of said traveling cables, with said strap member tightly encircling the elastomeric member and its associated traveling cable, said strap member loosely encircling all of the traveling cables in a non-stretched condition to provide a loose containment thereof, said fastening means maintaining the assembled relation of said elastomeric member and the strap member about said plurality of traveling cables.

* * * * *